United States Patent Office 3,833,686
Patented Sept. 3, 1974

3,833,686
SEQUENTIALLY PRODUCED ALKYL ACRYLATE POLYMERS BLENDED WITH POLY(VINYL HALIDES)
Raymond John Grochowski, Feasterville, Pa., Roger Kenneth Graham, Cherry Hill, N.J., and Jong Jai Whang, Seoul, Korea, assignors to Rohm and Haas Company, Philadelphia, Pa.
No Drawing. Continuation-in-part of abandoned application Ser. No. 865,198, Oct. 9, 1969. This application Sept. 10, 1971, Ser. No. 179,561
Int. Cl. C08f 15/00, 19/00
U.S. Cl. 260—876 R                 12 Claims

ABSTRACT OF THE DISCLOSURE

Processing aids of improved dispersibility in low molecular weight poly(vinyl chloride) compositions comprise a sequentially produced polymer characterized by 1 to 30 weight percent of (A) a first relatively soft stage characterized by a glass transition temperature of 60° C. or less; and 99 to 70 weight percent of (B) a final substantially thermoplastic stage polymerized in the presence of a product containing the first stage, and in intimate contact with the first stage and further characterized in that if the monomer or monomers were polymerized in the absence of the product of the first stage, a polymer would be formed having a glass transition temperature of 25° C. or greater.

---

This application is a continuation-in-part of our pending patent application, Grochowski, Whang and Graham, S.N. 865,198, filed Oct. 9, 1969, now abandoned.

Poly(vinyl chloride) (PVC) compositions, in the absence of a plasticizer or processing aid, are difficult to process into homogeneous, useful objects. The compositions are difficult to flux and the resulting melts are heterogeneous and "cheesy" having poor hot strength and low elongation. Plasticizers eliminate many of these processing problems but with a resultant loss in product physical properties, particularly rigidity.

A class of polymers, notably acrylic, have been developed which improve processing properties with little or no resultant loss in physical properties. Thus acrylic copolymer processing aids, such as single stage copolymers of methyl methacrylate and alkyl acrylates, improve the rolling bank and other processing characteristics of PVC compositions during mill processing and extrusion. The acrylic modifiers generally provide the most processing improvement when they have physical characteristics, such as glass temperature, approximately equal to that of the PVC resin sought to be modified, hence relatively harder modifiers have been developed for use with the relatively higher molecular weight PVC compositions. However, these harder acrylic polymers do not disperse well in PVC compositions based on relatively low molecular weight PVC. The acrylic modifiers containing relatively large quantities of the softer alkyl acrylate units are more easily dispersed in these compositions, however these softer acrylic polymers have other deficiencies. Thus they are difficult to prepare—they are characterized by low minimum film forming temperatures—and are difficult to handle during their manufacture, such as during isolation procedures including spray drying. Spray drying is an industrially attractive method of isolation in that it is rapid and provides a final product in a finely divided form easily dispersible in PVC. These softer polymers tend to agglomerate thus reducing the dispersibility efficiency. Thus while some of the softer acrylic copolymers offer improved processing characteristics in some ways, their deficiencies somewhat offset their advantages.

Acrylic polymers are also useful as impact modifiers in PVC resins. The improvement in impact strength imparted through the inclusion of these modifiers is derived from their relatively large quantity of soft, elastomeric alkyl acrylate polymer portion. Thus, when a hard phase is attached to these elastomeric impact modifiers, it is present in a relatively small proportion to the amount of the elastomer in order to be able to add as little modifier as possible to obtain the highest impact strength. Generally, these impact modifiers detract from or only slightly improve the processing characteristics of the PVC resin.

The present invention provides means for simultaneously upgrading many of the processing and physical characteristics of acrylic modifiers, while improving the processing characteristics and physical properties of the blends of acrylic modifiers in PVC resins. Furthermore the modifiers of the present invention are characterized by an improved ease of manufacture. Thus the molecular weights of the acrylic modifiers are easily controllable and the modifiers may be prepared in emulsion at higher solids content. Further, the acrylic modifiers have a higher minimum film forming temperature and may be isolated from emulsion using normal spray drying techniques. The acrylic modifiers of this invention also do not agglomerate even at high temperature storage conditions.

As an additional advantage of this invention, the acrylic modifiers may be blended into PVC resins more easily and provide better dispersibility than standard high methacrylate content acrylic modifiers. During processing on heated mills, the acrylic modifiers of this invention are characterized by excellent mill release properties.

As a further advantage of this invention, it has been found that compositions comprising the acrylic modifiers of this invention and PVC resins are more easily processed in extrusion equipment; in particular melt fracture and melt viscosity are reduced and die swell is minimized. Finally, advantages of this invention are obtained in final formed products using the compositions of this invention. These final formed products exhibit higher clarity and improved light transmission as well as lower odor than the molding compositions based on standard acrylic processing aids.

The term "molding" or "forming compositions" as used throughout the specification is not meant to limit use of these compositions, but refers to the broad class of forming processes, such as injection, extrusion, calendering, blowing film, and other molding processes.

The processing aids of this invention are characterized by a relatively low proportion of "soft" stage, i.e. 1 to 30 weight percent of a first stage having a glass transition temperature of 60° C. or 25° C. or less. The compositions of this invention comprise about 70 to 99 weight percent of a poly(vinyl chloride) and about 1 to 30 weight percent of a sequentially produced polymer characterized by 1 to 30 weight percent of (A) a first relatively soft stage polymerized from a monomer mixture of 1.5 to 100 weight percent of an alkyl acrylate wherein said alkyl group has 1 to 18 carbon atoms, correspondingly 0 to 98.5 weight percent of at least one different copolymerizable monoethylenically unsaturated monomer, and 0 to 10 weight percent of a copolymerizable polyfunctional crosslinking monomer, the first stage further characterized by a glass transition temperature of 60° C., preferably 25° C., or less; and 99 to 70 weight percent of (B) a final substantially thermoplastic stage polymerized in the presence of the first stage from a monomer mixture of at least one polymerizable monoethylenically unsaturated monomer to form a polymer in intimate contact with the first stage, stage (B) further characterized in that if said monomer or monomers were polymerized in the absence of said first stage, a polymer would be formed having a glass transition temperature of greater than that of the first stage and of 25° C. or greater, and preferably 60° C. or greater. It is a critical aspect of the present invention that the sequentially produced polymer be characterized by the presence of no more than 30 weight percent of the first, relatively soft stage. As will be shown *infra* in the examples, improvement in processing characteristics of PVC compositions decreases substantially as the proportion of soft stage is increased above this level. Preferably the polymer is characterized at 5 to 25, most preferably 5 to 20, percent by weight of (A), the first stage, and preferably 95 to 75, most preferably 95 to 80, percent by weight of (B), the final substantially thermoplastic stage.

The first stage is polymerized from a monomer mixture of 1.5 to 100, or preferably 25 to 95 weight percent of an alkyl acrylate wherein the alkyl group contains 1 to 18 carbon atoms. Preferably the alkyl acrylate is one in which the alkyl group contains 1 to 8 carbon atoms. Examples of suitable alkyl acrylates include butyl acrylate, ethyl acrylate and 2-ethylhexyl acrylate. Ethyl acrylate and butyl acrylate are preferred. The monomer mixture which is polymerized to form the first stage may also contain 0 to 98.5 weight percent, or preferably between 5 to 75 weight percent of at least one different copolymerizable monoethylenically unsaturated monomer; that is at least one monomer that is not an alkyl acrylate, is monoethylenically unsaturated and is copolymerizable with the alkyl acrylate and any other monoethylenically unsaturated monomer used in forming the first stage.

The term "monoethylenically unsaturated monomer" comprises a well-known and precisely defined class of monomers as evidenced by use of this or closely related terms in the following patents: Balmer et al., U.S. 3,224,-996; Van Hook, U.S. 3,284,399; Cenci et al., U.S. 3,284,-545; Himei, U.S. 3,288,886; Hall et al., U.S. 3,424,823; Cenci et al., U.S. 3,485,775; Hurwitz et al., U.S. 3,536,-788; and British 963,295. Suitable for use as the monoethylenically unsaturated monomer are alkyl acrylates in which the alkyl group contains no more than eighteen carbon atoms, preferably no more than eight carbon atoms; alkyl methacrylates in which the alkyl portion contains no more than eighteen carbon atoms, preferably no more than eight carbon atoms; acrylonitrile; methacrylonitrile; acrylic acid; methacrylic acid; styrene; and substituted styrenes particularly alkyl substituted styrenes wherein the alkyl group contains no more than fourteen carbon atoms. Typical of the suitable monomers are ethyl acrylate, butyl acrylate, 2-ethylhexyl acrylate, methyl methacrylate, tert.-butyl methacrylate, cyclohexyl methacrylate, acrylonitrile, methacrylonitrile, acrylic acid, methacrylic acid, styrene, o-chlorostyrene and α-methyl styrene. Styrene and methyl methacrylate are the preferred monomers.

This first stage is preferably non-crosslinked, which means that preferably no polyethylenically unsaturated monomer is added to the monomer mixture from which the first stage is formed. However, wherever the first stage is crosslinked, it is preferably polymerized from a monomer mixture containing 0.2 to 6.0 weight percent polyfunctional crosslinking monomer. The term "polyfunctional crosslinking monomer" is well known and refers to a distinct art-recognized group. As used in this specification and the claims, the term includes difunctional or bifunctional crosslinking monomers, that is monomers containing two reactive or functional groups, as well as monomers containing more than two reactive or functional groups. Monomers which have this ability to uniformly crosslink the first stage are those which can be incorporated evenly in the polymerization reaction and independently of the extent of the completion of the reaction. In other words, their rate of consumption is essentially the same as that of the principal monomer such as the alkyl acrylate. It is therefore preferred to use as the crosslinking monomer an alkylene glycol diacrylate such as ethylene glycol diacrylate, 1,3-butylene glycol diacrylate, 1,4-butylene glycol diacrylate, and propylene glycol diacrylate. Other crosslinking monomers such as the corresponding dimethacrylates to the diacrylates above, divinyl benzene, divinyl adipate or diallyl phthalate also may be used.

The term "monomer mixture" in this specification encompasses a solution, suspension, emulsion or mixture of components or any polymerizable combination of monomers.

There is no restriction on the combination of monomers mentioned above, used to form the first stage except that they form a polymer characterized by a glass transition temperature of 60° C. or less, preferably 25° C. or less. Glass transition temperatures and their determination are well known to those skilled in the art as evidenced by *Polymer Handbook*, Brandrup et al., Interscience Publishers, Div. of J. Wiley and Sons, Inc. (1966), p. III–61 to III–63; *High Polymers*, vol. VI; *Monomeric Acrylic Esters*, Riddle, Reinhold Publishing Corporation (1954), pp. 58 to 64; and T. G. Fox, Bull. Am. Physics Soc., vol. 1, No. 3, p. 123 (1956).

The final stage of the processing aids of this invention is a relatively hard, substantially thermoplastic stage polymerized in the presence of the first stage from a monomer mixture of at least one polymerizable monoethylenically unsaturated monomer to form a polymeric stage in intimate contact with the first stage. The final stage polymerization forms a polymer in intimate contact with the first stage. In other words the final stage is the next succeeding stage in relationship to the first stage and sequentially produced polymers characterized by intermediate stages, e.g. such as a stage polymerized from styrene, between the first stage and the final stage are excluded from the present invention.

The monomers used to form the final stage may be any of the suitable monomers mentioned above as suitable for forming the first elastomeric stage so long as this stage is characterized in that if the mixture of monomers were polymerized in the absence of the first stage, a product would be formed having a glass transition temperature greater than that of the first stage. Generally the final stage may be characterized in that it would have a glass transition temperature greater than 25° C., preferably greater than 60° C. Preferred monomers are methyl methacrylate, styrene or α-methylstyrene, acrylonitrile and a combination of ethyl acrylate and methyl methacrylate and a combination of styrene and acrylonitrile.

Preferred compositions are characterized by a first non-crosslinked stage polymerized from a monomer mixture of 1.5 to 100, or 25 to 95, weight percent of an alkyl acrylate wherein the alkyl group contains 1 to 4 carbon atoms and 0 to 98.5 or 5 to 75 weight percent of styrene or methyl methacrylate and a final substantially thermoplastic stage polymerized from a monomer mixture of 1.5 to 100 or 40 to 95 weight percent methyl methacrylate and 0 to 98.5, or 5 to 60 weight percent of a different copolymerizable monoethylenically unsaturated monomer such as styrene or ethyl acrylate. Another preferred composition is characterized by a final rigid stage polymerized from 90 to 70 weight percent styrene and 10 to 30 weight percent acrylonitrile.

The present invention encompasses both compatible and incompatible processing aids as those terms are used in the PVC modifier art. The present invention also encompasses processing aids in which one or more stages is made up of monomers in such proportions so that the refractive index of the resulting stage or stages is matched to the refractive index of the PVC resin thus resulting in a clear composition.

The processing aids of the present invention are prepared by solution, suspension or emulsion or any suitable polymerization procedure utilizing a multi-stage or sequential technique. The term "monomer mixture" in this specification encompasses a solution, suspension, emulsion or mixture of components or any polymerizable combination of monomers. The monomers of the initial stage, together with polymerization initiators, soap or emulsifiers, polymerization modifiers and chain transfer agents and the like are formed into the initial polymerization mix and polymerized, e.g. by heating and mixing the emulsion, in well known and wholly conventional fashion, until the monomers are substantially depleted and a seed polymer is formed. Monomers of the second, and in turn, of each, if any, additional stage are then added with appropriate other materials e.g. supplementary initiators, soap, modifiers, and the like, so that the desired polymerizations of each stage occurs in sequence to substantial exhaustion of the monomers. In each stage subsequent to the first, the amounts of the initiator and soap, if any, are maintained at a level such that polymerization occurs at or near the surface of the existing particles, and no substantial number of new particles, or seeds, form in the emulsion. The stages vary in hardness, from a relatively soft elastomer first stage seed to the hard rigid thermoplastic final stage. Both the elastomer and the rigid thermoplastic can contain chain transfer agents, in one or all stages, and, if desired the rigid thermoplastic stage can contain polyfunctional crosslinking monomers. However, it is a characteristic of the preferred embodiment of the present invention that the first "soft" stage is non-crosslinked. What is meant by the term "non-crosslinked" is that no crosslinking monomers are present in the monomer mix used to form the elastomer stage.

The molecular weight of the respective stages and of the resulting processing aid may vary over a wide range. It may be desirable though to control the molecular weight of a particular stage of a particular processing aid within the broad scope of this invention so that, for example, the first, relatively soft stage, is of a relatively low molecular weight, e.g. less than 450,000, or preferably 10,000 to 50,000.

When molecular weight control is desired, numerous techniques are known for accomplishing such and there is no criticality in the present invention in any particular technique. However, when it is desirable to control molecular weight, a preferred method is the use of a chain transfer agent such as an alkyl mercaptan in the polymerization mix of the first stage. Suitable chain transfer agents in this invention include the $C_4$ to $C_{12}$ and higher alkyl mercaptans particularly n-dodecyl mercaptan. Other techniques for controlling molecular weight of the first stage include the use of peroxide, operations at high temperatures or the use of allyl compounds.

The polymerization reactions can be initiated by either thermal or redox type initiator systems. Examples of thermal initiators include the organic peroxides, such as benzoyl peroxide, substituted benzoyl peroxides, acetyl peroxides, lauroyl peroxide, t-butyl hydroperoxide, di-t-butyl hydroperoxide, peresters, such as t-butyl peroxypivalate, azo-type initiators such as azo-bis-isobutyronitrile, persulfates, such as sodium, potassium or ammonium persulfate, and peroxyphosphates such as sodium, potassium, or ammonium peroxyphosphate. Redox initiators are generally a combination of a hydroperoxide, such as hydrogen peroxide, t-butyl-hydroperoxide, cumene hydroperoxide, diisopropylbenzene hydroperoxide, and the like, with a reducing agent, such as a sodium, potassium, or ammonium bisulfite, metabisulfite, or hydrosulfite, sulfur dioxide, hydrazine, ferrous salts, ascorbic acid, sodium formaldehyde sulfoxylate and the like, as are well known in the art.

Examples of emulsifiers or soaps suited to polymerization processes of the present invention include alkali metal and ammonium salts of alkyl, aryl, alkaryl, and aralkyl sulfonates, sulfates and polyether sulfates, ethoxylated fatty acids, esters, alcohols, amines, amides, alkyl phenols, complex organophosphoric acids and their alkali metal and ammonium salts.

The thermoplastic vinyl halide polymers of the present invention are the polymers and copolymers of vinyl halides, preferably chlorides, widely utilized in the production of plastic articles. These polymers are referred to as poly(vinyl halides) or vinyl chloride polymers (PVC) in the present invention, and for most all uses must be modified, compounded or copolymerized with other materials to provide processable and useful compositions. For the purpose and scope of this specification the terms "poly(vinyl halide)" or "vinyl chloride halide" or PVC resins or like terms will include all compositions which have vinyl chloride or other halide as the major (greater than 50%) component monomer. The compositions include but are not limited to: poly(vinyl chloride) [PVC], copolymers of vinyl chloride with other monomers that include vinyl alkanoates such as vinyl acetate and the like, vinylidene halides such as vinylidene chloride, alkyl esters of carboxylic acids such as acrylic acid, ethyl acrylate, 2-ethylhexyl acrylate and the like, unsaturated hydrocarbons such as ethylene, propylene, isobutylene and the like, allyl compounds such as allyl acetate and the like; for flexibility vinyl halide polymers are often compounded with plasticizers such as dioctyl phthalate, poly(propylene adipate) and the like, and other modifiers such as chlorinated polyethylene; methacrylate/butadiene/styrene polymers; acrylonitrile/butadiene/styrene polymers; ethylene/vinyl acetate polymers, and many other materials are often included. For general applications vinyl chloride polymers with Fikentscher K-values in the range of 40 to 95, preferably about 50 to 75, are used. The Fikentscher K-values is determined by the formula $$\frac{\text{Log } [\eta] \text{ rel.}}{C} = \frac{75 \times 10^{-6} K^2}{1 + 1.5 \times 10^{-3} KC} + 10^{-3} K$$

where

C is 0.5 gm./100 ml. concentration of polymer in solvent,
$[\eta]$ rel. is relative viscosity in cyclohexanone at 25° C. and
K is Fikentscher value.

When copolymers of vinyl chloride are utilized in the practice of the present invention, it is usually preferable to utilize a polymer containing from 0 to 15 weight percent of comonomer. The preferred comonomers are preferably vinyl alkanoates, such as vinyl acetate, and ethylene and propylene. The most preferable copolymer contains up to 10 weight percent of the comonomer, with the remainder being vinyl chloride. These copolymers of vinyl chloride and another monomer, mentioned above, are often softer than homopolymers of vinyl chloride.

Finally, the most preferred polymers and the polymers which are most effectively modified by the composite interpolymers of the present invention are the homopolymers of vinyl chloride and copolymers of vinyl chloride and vinyl acetate, ethylene or propylene. As pointed out above, the processing aids of the present invention find particular utility with relatively lower molecular weight vinyl halide polymers. For this reason, the vinyl halide polymer in which the processing aids find their greatest use is characterized by a Fikentscher K-value in the range of 50 to 60.

The above copolymers vary in physical characteristics such as viscosity, and molecular weight. The copolymers generally are of slightly lower molecular weights than PVC. Also, the viscosity values are often slightly lower, although generally within the above range. These differences however, are not limiting to the present invention which is directed to modifying such polymers and not the polymers themselves. The polymers, however, as is obvious, must be suitable for the use desired when modified, and physically must be of a type to which the present modifiers can be added.

Blends of the multi-stage polymer and the vinyl halide polymer can be accomplished by any convenient technique. Entirely satisfactory blends can be accomplished on a roll mill at convenient and customary operating conditions, such as about 350° F. in about 5 minutes or less time. Dry mixing techniques, as with a mechanical mixer-blender device, can also be employed. The powder blends can, if desired, be processed in commercial extrusion equipment at conditions varying with the molecular weight of the polyvinyl halide used and the equipment employed for that purpose. The resulting compositions may contain 70 to 99 weight percent of the poly(vinyl halide) and about 1 to 30 weight percent of the multi-stage polymer processing aid. Preferably the compositions contain 1.5 to 10 weight percent of the processing aid with 98.5 to 90 percent PVC and most preferably comprise 2 to less than 5 percent by weight multi-stage polymer with 98 to more than 95 percent by weight PVC resin.

Certain lubricants, stabilizers, and the like are often incorporated in the blends. The stabilizers serve to prevent the breakdown of the polyvinyl halide and are of several different types. Two varieties stabilize against thermal and ultraviolet light stimulated oxidative degradation, discoloration, and the like.

Other additives to the blends prepared in accordance with the present invention may include colorants, including organic dyes, such as anthraquinone red, and the like, organic pigments and lakes such as phthalocyanine blue and the like, and inorganic pigments such as titanium dioxide, cadmium sulfide, and the like; fillers and particulate extenders such as carbon black, amorphous silica, asbestos, glass fibers, magnesium carbonate, and the like; plasticizers such as dioctyl phthalate, dibenzyl phthalate, butyl benzyl phthalate, hydrocarbon oils, and the like; and impact modifiers such as typical methacrylate/butadiene/styrene modifiers and others.

While only a few of such materials have been specifically recited, it is not intended to exclude others; the recitation is exemplary only, and each category of additives is common and well-known in the art. The inclusions can be made at any stage of preparation in accordance with accepted techniques well-known to those ordinarily skilled in the art, in proportions which are commonly employed. Such additional materials are not of particular significance in the present invention.

To assist those skilled in the art in the practice of the present invention, the following modes of operation are set forth as illustrations, parts and percentages mean by weight unless otherwise specifically noted. The following abbreviations are used; acrylonitrile (AN), butyl acrylate (BA), ethyl acrylate (EA), methyl methacrylate (MMA) and styrene (S); / is used to divide monomers of the same stage and // separates the different stages of the sequentially produced polymers.

EXAMPLE 1

The following procedure illustrates a process for making the multi-stage acrylic composite polymers of the present invention. The polymer illustrated is characterized by a butyl acrylate/styrene/ethyl acrylate/methyl methacrylate (38.4/57.6/0.4/3.6) first stage ($T_g$ 18° C.) and a methyl methacrylate/styrene (54/46) second stage ($T_g$ 104° C.) where the ratio of the first stage to the second stage is 1/9.

Two parts of acetic acid (5% aqueous solution) and 881 parts of distilled water are mixed under nitrogen with stirring. The temperature is adjusted to 40° C. and 82 parts of a monomer mixture is added. The monomer mixture contains 5 parts acetic acid (5% aqueous solution), 6.5 parts sodium lauryl sulfate, 170 parts of distilled water, 15 parts n-dodecyl mercaptan, 192 parts n-butyl acrylate, 288 parts styrene, 2 parts ethyl acrylate, 18 parts methyl methacrylate, and 5 parts cumene hydroperoxide. A solution (25 parts) of 1 part sodium sulfoxylate formaldehyde in 25 parts water is added and the nitrogen sparge is reduced. Over 1.5 hours an additional 618 parts of the above monomer mix are added. After the reaction is completed, the product is filtered and the emulsion is evaporated in a vacuum oven for 2 to 3 days at 60° C. to give a semi-solid material $[\eta]$ acetone=0.13.

Distilled water, 897 parts, and 287 parts of an emulsion of the preceding prepared polymer (90 parts solids) are mixed under nitrogen sparge. The temperature is adjusted to 44–45° C. and a solution (0.81 parts) of 5 parts sodium sulfoxylate formaldehyde in 5 parts water is added. A monomeric mixture (1076.18 parts) is then added to the reaction mixture over one hour. The monomer mixture contains 105 parts of a 10% aqueous solution of sodium lauryl sulfate, 160 parts of distilled water, 437 parts methyl methacrylate, 373 parts styrene and 1.18 parts cumene hydroperoxide. The resulting product is cooled and filtered through cheesecloth. An aliquot of the emulsion is evaporated in a vacuum oven for 2 to 3 days at 60° C. to yield a solid of $[\eta]$ methyl ethyl ketone (MEK)=0.98. The balance of the emulsion is spray-dried.

Sample B is similar to sample A above except the ratio of Stage I to Stage II is 1/3. Sample C is similar to A except the Stage II composition is methyl methacrylate/ethyl acrylate=9/1. Samples D, E and F are like C except the Stage I to Stage II ratios are 1/3, 1/1 and 3/2 respectively.

EXAMPLE 2

The acrylic modifiers A through F, as prepared in Example 1 were all dry blended into the following formulation:

90 parts medium to high molecular weight PVC
10 parts processing aid as shown
1 part tin heat stabilizer
0.5 part stearic acid The blends are all milled for 7 minutes at 350° F. and pressed at 350° F. into 100 mil sheets for physical testing. Mill-processing is qualitatively rated as to rolling bank (RB), thermoplasticity (TH), hot strength (HS), and release from mill roll (Rel.), as poor (P), fair (F), good (G), and excellent (E). Typical physical tests include Izod impact strength, ASTM D256–56–A (Izod), clarity as measured by percent total white light transmittance (percent WL) and percent haze as measured by the difference between the total light transmittance through the sheet less the parallel light transmittance divided by the total light transmittance, static heat stability in a 350° F. oven as measured by hours to color or hours to char, crease-whitening resistance (CWR) as rated on a qualitative numerical scale wherein 0 is no crease-whitening and 10 is poor resistance, and other physical properties. Milled, but unpressed sheets are chopped and submitted for determination of melt viscosity $[(\eta)$ as measured in poises] and die-swell in a Sieglaff-McKelvey Rheometer at 400° F. at a shear rate of $10^3$ seconds$^{-1}$.

Dispersibility of the acrylic modifier in the PVC resin is determined in a similar composition containing a low molecular weight propylene/vinyl chloride copolymer. Dispersibility is rate on a qualitative numerical scale from 0 to 10, wherein 0 is excellent and 10 is poor.

Additional details of typical formulations, processing techniques and test procedures are provided in Rohm and Haas Company Technical Bulletin "Testing and Evaluation of Paraplex and Monoplex Plasticizers," No. MR–80, June 1968, printed and made available through the Resins Department of Rohm and Haas Company, Philadelphia, Pa. 19105.

Typical properties obtained with the acrylic modifiers prepared in Example 1 and the molding compositions containing these modifiers are provided in Table 1. The results shown in this Table indicate that the improvement in processing characteristics of PVC compositions decreases substantially as the proportion of soft stage in the sequentially produced polymer is increased above 30 percent.

TABLE 1

| Sample | Dispersibility | Processing (350° F.) | | | | Clarity | | Rheology | | Dynamic heat stability 385° F. | | Izod impact | $\bar{M}_v \times 10^{-5}$ | |
|---|---|---|---|---|---|---|---|---|---|---|---|---|---|---|
| | | Rolling bank | Thermoplasticity | Hot strength | Release | Percent WL | Percent haze | Poises | Percent swell | Min. to stick | Min. to char | | Stg. I | Stg. II |
| A | 3 | G− | G+ | E− | G | 86.5 | 5.6 | 7,293 | 9 | 8 | 33 | 0.46 | 0.19 | 7.5 |
| B | 1 | G− | E− | G− | G | 87.3 | 4.9 | 5,834 | 7 | 39 | 44 | 1.04 | 0.19 | 11.0 |
| C | 7 | G− | E− | E− | G | 84.5 | 7.1 | 9,116 | 31 | 17 | 35 | 0.54 | 0.19 | 9.6 |
| D | 2 | G− | E− | G | G | 84.7 | 5.5 | 7,475 | 19 | 23 | 40 | 0.51 | 0.19 | 6.9 |
| E | 0–1 | F | G− | F+ | G | | | | | | | | 0.19 | 10.0 |
| F | 0–1 | F | F+ | F | G | | | | | | | | 0.19 | 15.0 |

EXAMPLE 3

The following compositions shown in Table 2 are prepared according to the procedure of Example 1 and are incorporated into PVC according to Example 2. The Table 2 presents mill processing, dispersion and other characteristics of the resulting compositions.

TABLE 2

| Composition | Dispersibility | Mill processing, 350° F. | | | | | Clarity | |
|---|---|---|---|---|---|---|---|---|
| | | Flux time (min.) | Rolling bank | Hot strength | Thermoplasticity | Release | Percent white light transmission | Percent haze |
| First stage*//MMA/EA 10//81/9 | 7 | ½ | G− | E− | E− | G | 84.5 | 7.1 |
| First stage*//MMA/EA 25//67.5/7.5 | 2 | ½ | G− | G | E− | G | 84.7 | 5.5 |
| EA//MMA/S 10//48.6/41.4 | 4–5 | ½ | G | G | E | E− | 83.5 | 5.9 |
| EA//MMA/S 25//40.5/34.5 | 2–3 | ½ | G | G | F | G | 81.4 | 7.9 |

*First stage is BA/S/MMA/EA; 23/34.6/2.2/0.2 parts by weight.

What is claimed is:

1. A composition of improved processability comprising about 70 to 99 weight percent of a poly(vinyl halide) and about 1.0 to 30 weight percent of a two-stage sequentially produced polymer characterized by 1 to 25 weight percent of (A) a first relatively soft stage polymerized from a monomer mixture of 1.5 to 100 weight percent of an alkyl acrylate wherein said alkyl group has 1 to 18 carbon atoms, correspondingly 0 to 98.5 weight percent of at least one different copolymerizable monoethylenically unsaturated monomer, and 0 to 10 weight percent of a copolymerizable polyfunctional crosslinking monomer, said first stage further characterized by a glass transition temperature of 60° C. or less; and 99 to 75 weight percent of (B) a final, relatively hard, substantially thermoplastic stage polymerized in the presence of said first stage from a monomer mixture of at least one polymerizable monoethylenically unsaturated monomer to form a polymer in intimate contact with the first stage, stage (B) further characterized in that, if said monomer of monomers were polymerized in the absence of said first stage, a polymer would be formed having a glass transition temperature greater than that of the first stage and of 25° C. or greater.

2. The composition of Claim 1 wherein the first stage is characterized by a glass transition temperature of 25° C. or less and the final stage would have a glass transition temperature of 60° C. or greater.

3. The composition of Claim 1 wherein the sequentially produced polymer is a two stage polymer characterized by 5 to 25 weight percent of the first stage and 95 to 75 weight percent of the final stage.

4. The composition of Claim 1 wherein the sequentially produced polymer is a two stage polymer characterized by 5 to 20 weight percent of the first stage and 95 to 80 weight percent of the final stage.

5. The composition of Claim 1 wherein the first stage is polymerized from a monomer mixture of 25 to 95 weight percent of an alkyl acrylate which is ethyl acrylate or butyl acrylate and correspondingly 5 to 75 weight percent of at least one different copolymerizable monoethylenically unsaturated monomer.

6. The composition of Claim 5 wherein the different copolymerizable monoethylenically unsaturated monomer of the first stage is styrene or methyl methacrylate.

7. The composition of Claim 1 wherein the final stage is polymerized from a monomer mixture of 1.5 to 100 weight percent methyl methacrylate and 0 to 98.5 weight percent styrene or ethyl acrylate.

8. The composition of Claim 5 wherein the final stage is polymerized from a monomer mixture of 1.5 to 100 weight percent methyl methacrylate and 0 to 98.5 weight percent styrene or ethyl acrylate.

9. The composition of Claim 1 wherein the final stage is polymerized from a monomer mixture of 40 to 95 weight percent methyl methacrylate and 5 to 60 weight percent styrene or ethyl acrylate.

10. The composition of Claim 5 wherein the final stage is polymerized from a monomer mixture of 40 to 95 weight percent methyl methacrylate and 5 to 60 weight percent styrene or ethyl acrylate.

11. The composition of Claim 5 wherein the poly(vinyl halide) is a poly(vinyl chloride) characterized by a Fikentscher K-Value in the range of 50 to 60.

12. The composition of Claim 11 wherein the poly(vinyl halide) is a homopolymer of vinyl chloride or a copolymer of vinyl chloride and vinylacetate, ethylene or propylene.

References Cited

UNITED STATES PATENTS

| | | | |
|---|---|---|---|
| 3,562,235 | 2/1971 | Ryan | 260—885 |
| 3,426,101 | 9/1969 | Ryan et al. | 260—876 R |
| 3,251,904 | 5/1966 | Souder et al. | 260—876 R |
| 3,655,825 | 4/1972 | Souder et al. | 260 876 R |
| 3,678,133 | 7/1972 | Ryan | 260—876 R |

MURRAY TILLMAN, Primary Examiner

RICHARD B. TURER, Assistant Examiner

U.S. Cl. X.R.

260—23 XA, 23.5 R, 31.8 M, 33.6 UA, 45.75 K, 41 A, 41 B, 41 C, 41 AG, 881, 884, 885, 886